United States Patent

[11] 3,614,173

| [72] | Inventor | Orland D. Branson |
| --- | --- | --- |
| | | Sunland, Calif. |
| [21] | Appl. No. | 837,067 |
| [22] | Filed | June 27, 1969 |
| [45] | Patented | Oct. 19, 1971 |
| [73] | Assignee | The Bendix Corporation |

[54] SLIP COMMAND SKID CONTROL
20 Claims, 6 Drawing Figs.

[52] U.S. Cl............................................. 303/21 P,
188/181 C, 303/20, 317/5, 318/52, 324/161
[51] Int. Cl........................................................ B60t 8/10
[50] Field of Search............................................ 188/181 A,
181 C; 303/20, 21 A, 21 BB, 21 C, 21 CG, 21 P;
318/52; 317/5; 324/161, 162

[56] References Cited
UNITED STATES PATENTS

| 3,131,975 | 5/1964 | Smith et al. | 303/21 P |
| --- | --- | --- | --- |
| 3,235,036 | 2/1966 | Meyer et al. | 188/181 C |
| 3,499,689 | 3/1970 | Carp et al. | 303/21 P |

Primary Examiner—Milton Buchler
Assistant Examiner—Stephen G. Kunin
Attorneys—Robert C. Smith and Plante, Arens, Hartz, Hix and Smith ABSTRACT: A skid control system is described which modifies an operator's brake pressure request in such manner as to deliver maximum braking effectiveness by continuously searching the roadway surface condition to determine the percentage of tire slip at which maximum braking occurs and to modulate the brake pressure such that the percent tire slip is forced into the region resulting in maximum braking. An electrical wheel speed signal is generated in each braked wheel in which frequency varies with speed, and these signals are compared so that the fastest rotating wheel on one side of the braked vehicle is used, along with a time constant or delay circuit means to provide a wheel speed reference. The system will also operate with a single braked wheel. This reference is combined with a slip command signal to produce a wheel speed error signal. A small amount of the integral of this wheel speed error is added to itself, and the sum is supplied to a servovalve which may modify the operator's brake pressure command. When any of the wheels experiences a deceleration greater than a threshold value, indicating the point of maximum braking has been passed, an output pulse is provided which effectively reduces the slip command signal (percent slip) to force the slip back to slightly below the maximum braking point. The percent slip command is slowly increased at a fixed rate until the cycle is repeated, thus continuously locating the point of maximum braking point. The percent slip command is slowly increased at a fixed rate until the cycle is repeated, thus continuously locating the point of maximum braking and keeping the system in this region.

TIRE-RUNWAY CHARACTERISTICS $$\sigma = \frac{\dot{\theta}_S - \dot{\theta}_W}{\dot{\theta}_S}$$

SIMPLIFIED SKID CONTROL LOOP

INVENTOR.
ORLAND D. BRANSON

Fig 3

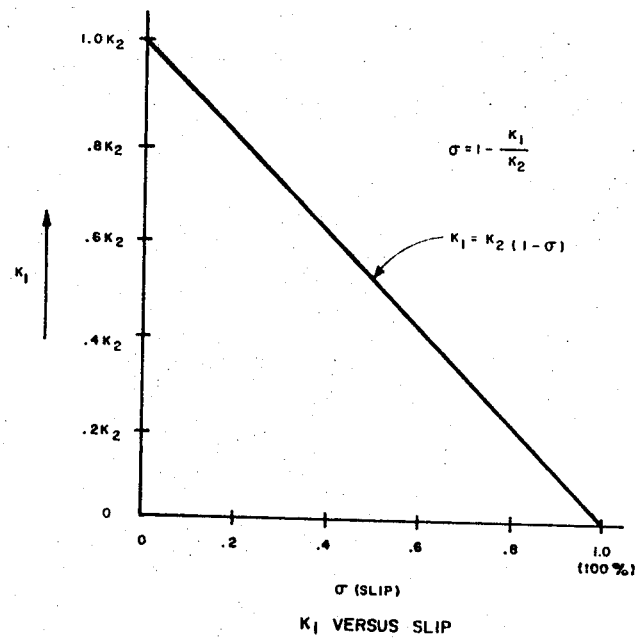

$K_1$ VERSUS SLIP

Fig 4A

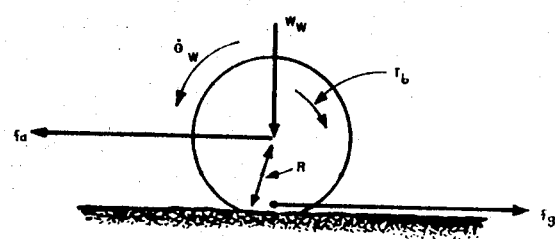

FREE BODY DIAGRAM OF WHEEL ASSEMBLY ON RUNWAY $W_w$ = WEIGHT ON WHEEL $J_w$ = POLAR MOMENT OF INERTIA OF WHEEL TIRE ASSEMBLY $T_b$ = BRAKE TORQUE $f_g$ = GROUND FORCE ON TIRE $f_a$ = HORIZONTAL AXLE FORCE $R$ = TIRE ROLLING RADIUS $\theta_w$ = WHEEL ANGLE OF ROTATION $\sigma$ = TIRE SLIP ON RUNWAY (SEE DEFINITION ABOVE)

$\mu_g$ = TIRE COEFFICIENT OF FRICTION

3,614,173

SLIP COMMAND SKID CONTROL

BACKGROUND OF THE INVENTION

There have been many systems proposed and built for the purpose of controlling the effects of skidding when brakes are applied to vehicles. Probably the most complex of these systems are for aircraft where the system must deal with a wide range of weights, speeds and runway conditions and where failure or malfunction may result in more serious problems than for ground vehicles, in general. In addition to requiring a high degree of reliability and braking efficiency, an aircraft skid control system is preferably as small and lightweight as possible consistent with the desired performance.

The performance requirements of skid control systems for recent large transport aircraft have been increased such that recent designs bear little resemblance to systems in common use a decade ago. Response times must be faster, wheel speed signals of higher resolution must be provided, and generally more sophisticated principles of operation have been developed. Since the skid control must, in a sense, compute a desired brake actuation, it has been necessary to reevaluate these computations and arrive at new kinds of computations for controlling brake pressure. Older type controls have generally operated to sense a skid in terms of a wheel deceleration exceeding a predetermined value and then have acted to relieve brake pressure, subsequently scheduling increasing brake pressure according to some predetermined pattern. This approach, in and of itself, has proved inadequate in that there are so many variables that it is almost impossible to get such a control to operate well under all conditions. Some newer designs have incorporated means to calculate instantaneous wheel slip directly with wheel slip ($\sigma$) being defined as follows:

$$\sigma = \frac{\dot{\theta}_s - \dot{\theta}_\omega}{\dot{\theta}_s} \quad (1)$$

where $\dot{\theta}_\omega$ = instantaneous wheel speed, and
$\dot{\theta}_s$ = synchronous or free running wheel speed.

A relationship which has been of great interest to skid control designers is that shown in FIG. 1 wherein the coefficient of friction between tire and runway ($\mu_g$) is plotted against tire slip ($\sigma$) expressed as a percentage where 100 percent represents a locked wheel. It will be observed that this relationship typically defines a family of curves having peaks at different values of $\mu_g$ but occurring at about the same range of slip. This has led some designers to attempt to control by computing the slope of the characteristic shown in FIG. 1 and responding to a computed negative slope by reducing brake pressure. Such systems tend to be quite complex as to mechanization because of the number and kind of input signals required for the computation, but they do potentially deal with the many aircraft and runway variables more adequately than earlier types.

DESCRIPTION OF THE DRAWINGS

FIG. 3 is a graph showing the relationship between slip command ($K_1$) and percentage slip ($\sigma$) for a constant value of a gain $K_2$.

FIG. 4a shows a free body diagram of the wheel assembly on the runway together with a legend identifying the various factors acting thereon.

SYSTEM CONCEPTS

The control system causes the braking system to deliver very high efficiency braking by performing the following two functions:

1. It continuously searches the runways to determine at what percent wheel slip the instantaneous maximum coefficient of friction, $\mu_g$, occurs and creates a corresponding per cent wheel slip command.
2. This wheel slip command forces the percent slip to the region containing this maximum $\mu_g$ and thus creates nearly maximum braking effectiveness.

Part I of the following explains how the control system converts the slip command to an actual percent slip of the wheel and tire as required to perform the second function above.

Part II of the following explains how the control system searches the runway and creates the percent slip command to perform the first function above.

PART I

Equation (1) above is equivalent to:

$$\sigma = 1 - \dot{\theta}_\omega/\dot{\theta}_s \quad (2)$$

Figure 2:
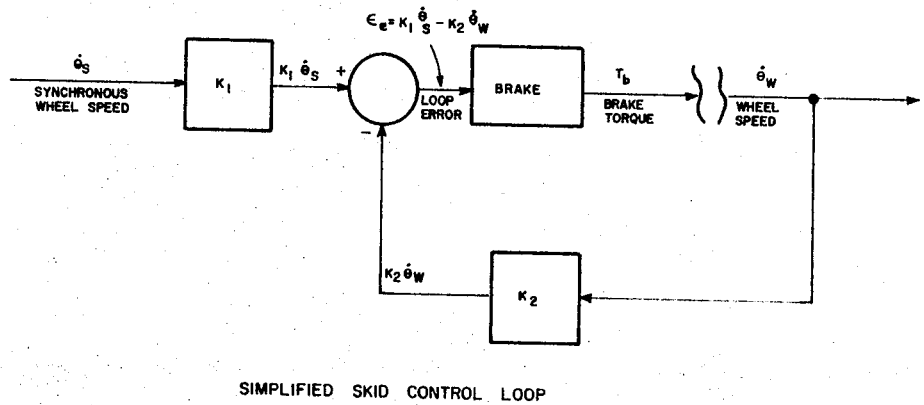
FIG. 2 is a block diagram of a simplified skid control loop.

Thus, by controlling $\dot{\theta}_\omega/\dot{\theta}_s$, wheel slip may be controlled. FIG. 2 shows a simplified feedback control loop which will drive the loop error toward zero. From this loop the following relationship will become apparent:

$$\epsilon_e = K_1\dot{\theta}_s - K_2\dot{\theta}_\omega \quad (3)$$

where $\epsilon_e$ = loop error
$K_1$ = a gain, and
$K_2$ = another gain.

When $\epsilon_e$ is zero, equation (3) may be expressed as:

$$\dot{\theta}_\omega/\dot{\theta}_s = K_1/K_2 \quad (4)$$

and substituting equation (4) into equation (2) gives $$\sigma = 1 - K_1/K_2$$

Thus a fixed value of $K_1$ and $K_2$ will cause the control system to create a fixed wheel slip irrespective of synchronous wheel speed provided the error, $\epsilon_e$, is kept near zero.

If the gain $K_1$ is varied and $K_2$ is held constant, the slip, $\sigma$, will vary accordingly. This gain $K_1$, then, becomes a slip command to the system. FIG. 3 shows the relationship of $K_1$ to the resulting slip $\sigma$.

PART II

Figure 4:
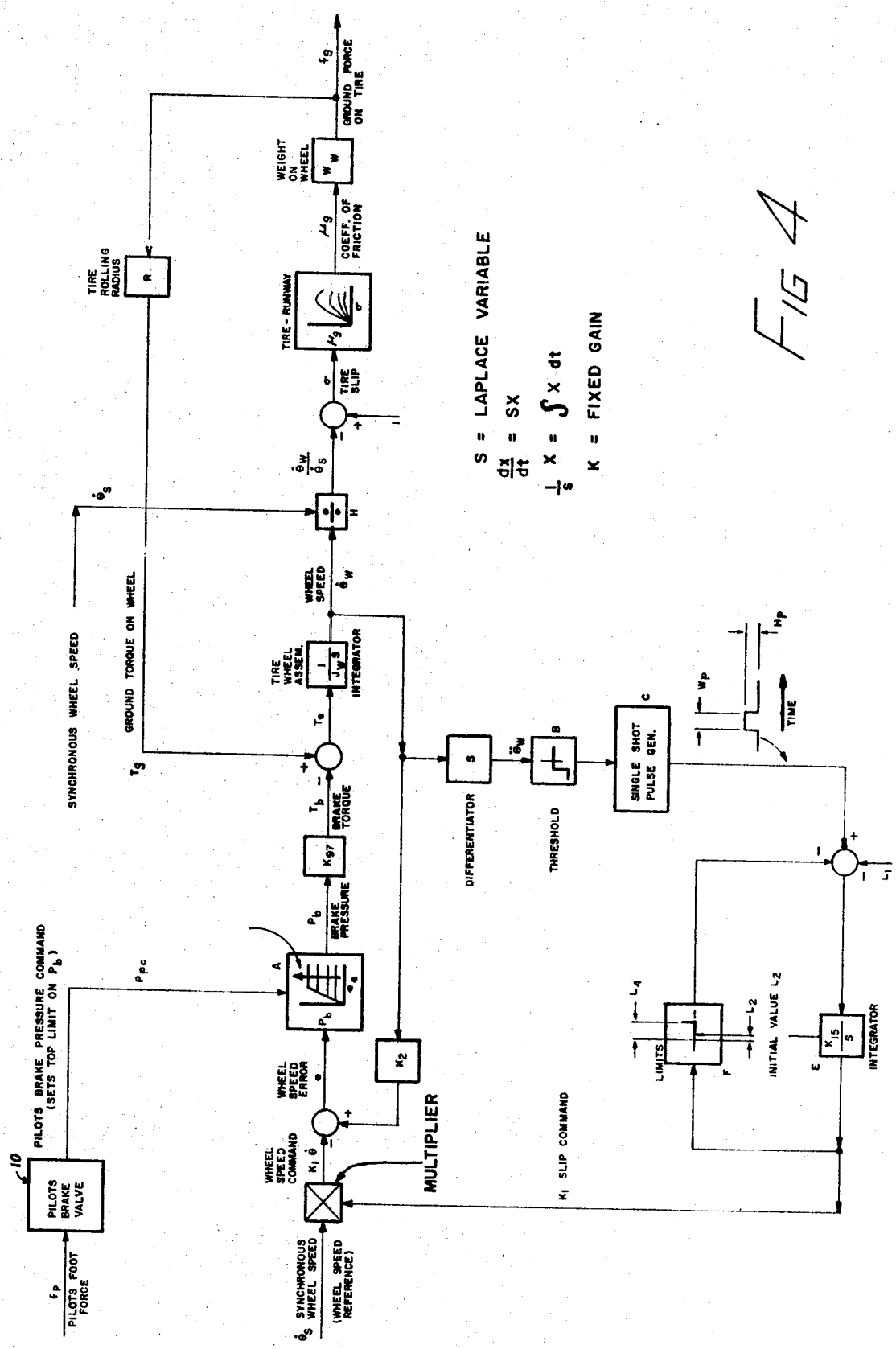
FIG. 4 is a block diagram of a simplified skid control system according to my invention.

FIG. 4a shows a free body diagram of the wheel assembly on the runway together with a legend identifying the various factors acting thereon. The portion of FIG. 4 shown in dotted outline actually is concerned with tire and runway conditions and the manner in which these factors affect the control system.

Figure 1:
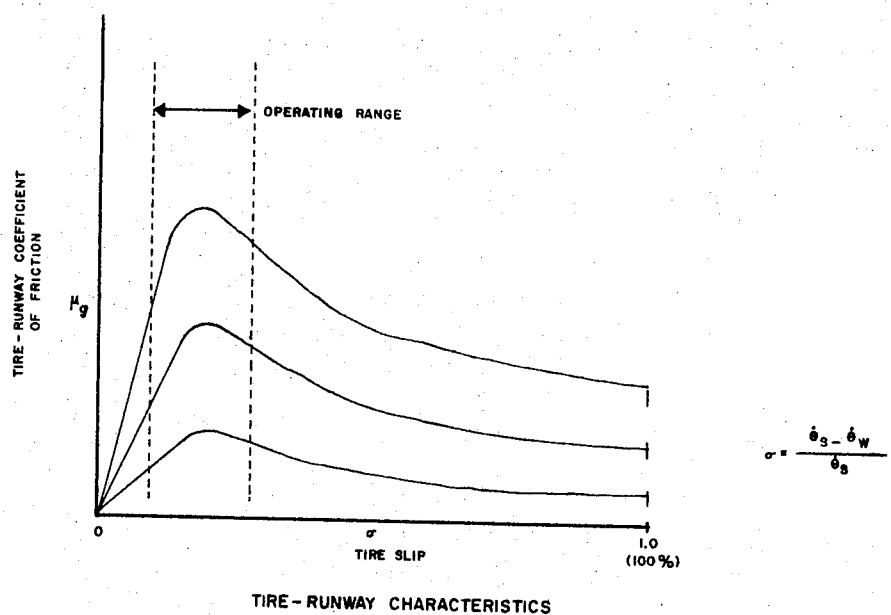
FIG. 1 is a graph in which typical values of tire surface or runway coefficient of friction ($\mu_g$) are plotted against percentage tire slip ($\sigma$).

The wheel speed error can result in brake pressure only to the limit of that commanded by the pilot exerting force on a brake valve 10. (See Box A) At zero brake pressure command the wheel speed $\dot{\theta}_\omega$ will be equal to the synchronous wheel speed $\theta_s$. In the initial application of brake pressure the loop error is positive and greater than that required to reach the peak of the $\mu_g$—$\sigma$ curve of FIG. 1, since the slip command $K_1$ is equal to its initial value of $L_2$. When the pilot's brake pressure command reaches a value sufficient to cause the slip $\sigma$ to reach the peak of the $\mu_g$—$\sigma$ curve, the wheel-tire-runway loop passes into its unstable positive feedback condition (this is the closed subloop from $T_b$ to $f_g$ shown in FIG. 4), resulting in a very high wheel deceleration which exceeds the threshold in Box B of FIG. 4. The output from Box B causes the Box C to produce a single pulse of constant height and duration for each time wheel deceleration exceeds the threshold level. These pulses are integrated by Box E to produce a slip command $K_1$. Each pulse produces a fixed incremental change in slip command, each increment reduces the slip command sufficiently (see FIG. 3) to drive the system from right to left over the peak of the respective curve in FIG. 1. (The system operates well even when the $\mu_g$—$\sigma$ curves have no peaks and are thus horizontal at their maximum value.)

After the pulse, the fixed input $L_1$ will reduce the value of $K_1$ at a fixed rate, thus slowly driving the slip $\sigma$ to higher values causing the cycle to repeat itself. The net effect is to force the tire to cycle back and forth in the narrow region of the peak in the $\mu_o$–$\sigma$ curve, regardless of the horizontal and vertical location of this peak. The only requirement for this cycling action is that the pilot must command at least enough brake pressure to reach the peak of the $\mu_o$–$\sigma$ curve of the particular runway condition existing at the moment.

Thus the sensing of a wheel deceleration exceeding the threshold built into Box B will result in a pulse outlet which varies the slip command $K_1$ (which is multiplied by the synchronous wheel speed input) in such direction as to move the percent slip to a lower value. Should this increment of change in $K_1$ be insufficient to force the operation into the positive slope portion of the $\mu_o$–$\sigma$ curve, the threshold deceleration signal of Box B will immediately be exceeded again, another pulse will be produced from pulse generator C, and the slip command $K_1$ will be forced to a still higher value to further reduce the percent slip (see FIG. 3).

DESCRIPTION OF THE PREFERRED EMBODIMENT

Figure 5:
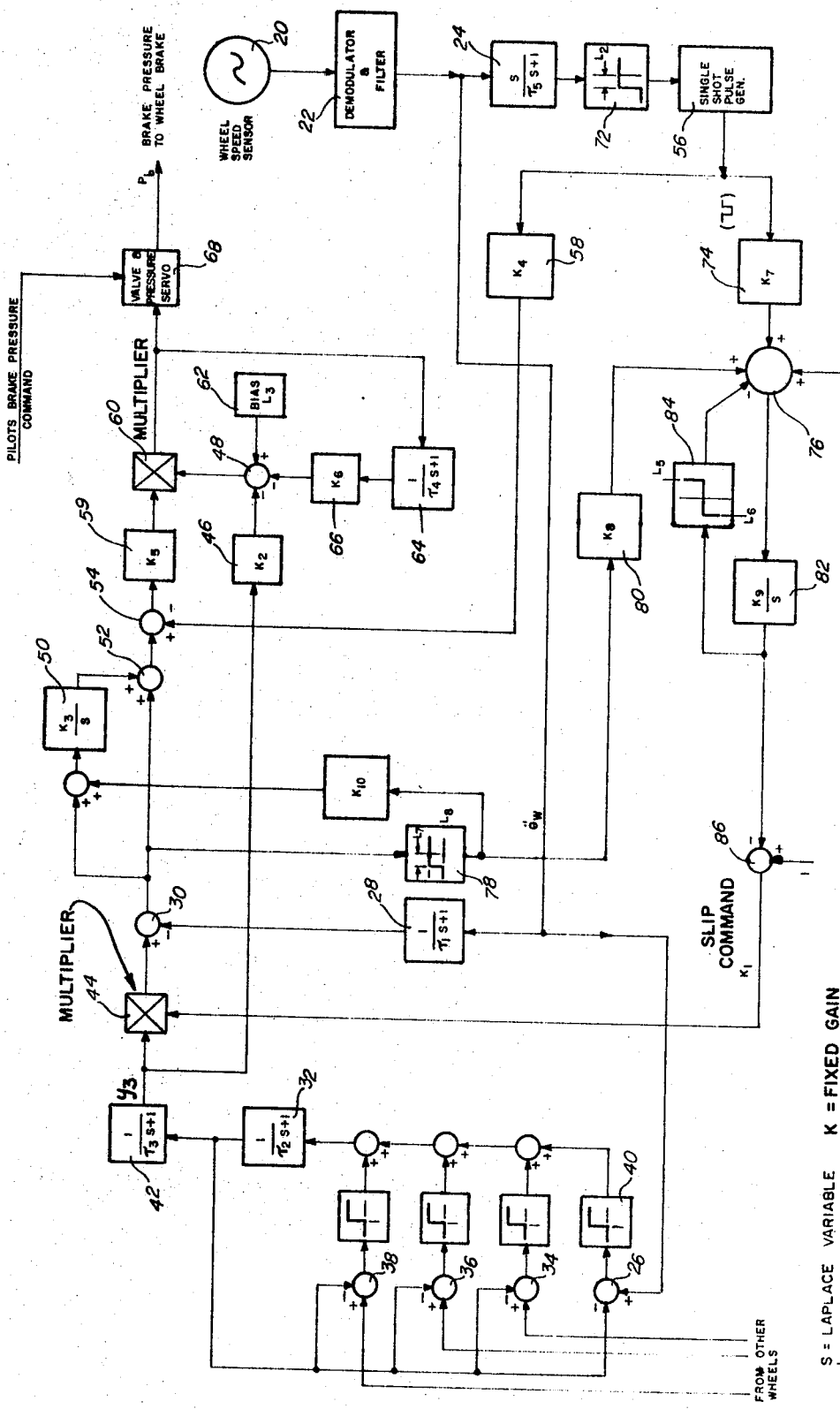
FIG. 5 is a block diagram of a skid control system similar to that shown in FIG. 4 but incorporating a number of additional features.

While synchronous wheel speed $\dot{\theta}_s$ is shown as the wheel speed reference in the block diagram of FIG. 4, it has been found that this exact variable has not been required to provide a satisfactory reference. A system block diagram like that of FIG. 4, but including further refinements, is shown in FIG. 5. In this system, a combination of signals from individual wheel speed signal generators is used to generate a wheel speed reference for all of the wheel circuits on the same side of the aircraft or other vehicle. By including a significant storage capability for the wheel speed signal, the stored signal (which approximately represents the highest wheel speed a short time previously) may be used successfully as a reference even for a one-wheel system. The synchronous, or free rolling, speed signal is not needed. The skid control system in effect searches the runway and locates the peak of the $\mu_o$–$\sigma$ curve, in relation to whatever wheel speed reference is used. If the reference differs from true synchronous wheel speed, the resulting slip differs correspondingly from true slip, but the skid control system is not effected in any way. It will command a slip based on this reference; however, the true slip resulting at the wheel will be the correct slip corresponding to the peak of the $\mu_o$–$\sigma$ curve. For this reason, the computed wheel speed reference ($y_3$ in FIG. 5) can be greatly in error from true synchronous speed without affecting the skid control system.

As shown in FIG. 5, a wheel speed sensor 20 (which typically consists of an electrical generator having a substantial number of poles) produces an alternating current signal whose frequency is proportional to the instantaneous wheel speed. This signal is demodulated and filtered in a demodulator 22 to produce a direct current voltage which varies with wheel speed, $\dot{\theta}'_w$, this signal being supplied to a differentiating circuit 24, to a summer 26, and through a time constant element 28 where it is compared with the wheel speed command signal in a summer 30. The time constant elements shown would typically include conventional resistance-capacitance networks, often in association with an operational amplifier as is well known to those skilled in circuit design. Summer 26 compares the demodulated wheel speed signal $\dot{\theta}'_w$ with the output from a time constant circuit 32 which is fed back in such manner as to oppose the wheel speed signal. A plurality of similar summers 34, 36 and 38 also receive wheel speed signals from their respective wheels. As will be observed from the block 40, which is one of several similar threshold circuits, a small positive input signal tends to cause a large step output which, after being processed in time constant circuit 32, is fed back in such manner as to tend to cancel the input to block 40. The structure of block 40 may consist essentially of a unidirectional conducting device such as a diode connected to ground by a regulator such as a Zener diode clamp. At any time the summers 26, 34, 36 and 38, acting in combination with their threshold circuits and additional summers, will select the speed signal representative of the speed of the fastest rotating wheel, and this establishes the reference signal which will be updated as one wheel or another becomes the fastest and thereby resets the effective reference in block 32 to a higher value. Thus this reference always responds to the input from the wheel giving the largest input signal, and this reference, once set, will decay at a rate controlled by the time constant of block 32, until reset to a higher value by an input from a wheel which is rotating faster than the instantaneous reference would call for. The output of block 32 is the basic wheel speed reference, but this signal may be modified as required for the dynamics of the system through an additional time constant circuit or element 42, before being supplied to a multiplier 44 where it is compared with the slip command signal $K_1$ to produce the wheel speed command signal. The wheel speed reference signal is also supplied through a gain ($K_2$) or amplifying element 46 to a summer 48.

Since the wheel speed command signal from multiplier 44 is compared in adder 30 with the wheel speed signal $\dot{\theta}'_w$, as modified by the time constant in block 28 (which is tailored to compensate for delays in the speed comparison loop, particularly time constant 42), a wheel speed error signal results which is supplied to an integrator 50 and to a summer 52. A portion of the integrated wheel speed error signal is added to the wheel speed error signal for a number of reasons:

1. It is not possible to use a sufficiently high loop gain in the wheel speed loop to result in a slip essentially equal to the commanded slip (in other words, the steady state wheel speed error cannot be driven close enough to zero). The use of this integrator causes the steady state wheel speed error to be near zero under all conditions.
2. The integrator contributes to low-frequency stability of the wheel speed loop by adding a low-frequency lead term.
3. The integrator serves to memorize the average value of valve current as the system is modulating back and forth over the peak of the $\mu_o$–$\sigma$ curve. This memory adjusts itself for slow variations but not for fast ones. Thus, it will compensate for various bias factors whether they come from the brake, electronic, or electrohydraulic equipment.

Another summer 54 combines the output of the single shot pulse generator 56 connected through a gain element ($K_4$) in box 58 with the output of summer 52. This pulse provides a short time release of brake pressure which enables the system to release brake torque more rapidly than ground torque is increasing.

The output of summer 54 is supplied through a gain element $K_5$ in block 59 to a multiplier 60 which is used for two reasons. The first is to keep the wheel speed loop gain from varying due to the effect of changing synchronous wheel speed. The steady-state gain from brake torque, $T_b$, (see FIG. 4) to wheel speed, $\dot{\theta}_{wt}$ varies approximately directly with synchronous wheel speed due to the presence of the variable $\dot{\theta}_w/\dot{\theta}_s$. The gain in the control system is varied to counteract this change in gain in the wheel-tire-runway action through the use of the gain in block 46 (FIG. 5) and a bias signal $L_3$ from a source 62.

The second reason is to vary the loop gain as a function of the brake pressure required by the runway. The average value of the valve current in servovalve 68 is related to the average value of the brake pressure. The feedback element 64 and gain 66 ($k_6$) are used to reduce the wheel speed loop gain with increasing average values of the valve current, or, in other words, with decreasing roughness of runway. This effect increases the braking efficiency at the low coefficient of friction runways, where low brake pressure is required, without adversely affecting braking action at high-friction runways.

The valve current supplied to the servovalve 68 (which may be a conventional electrohydraulic servovalve such as that shown in Healy U.S. Pat. No. 2,823,689) is essentially a command for brake torque up to the limit established by the pilot's brake pressure command.

The slip command is quite smaller to that shown in FIG. 4. The output of the differentiating means 24 is supplied to a threshold circuit 72 like Box B of FIG. 4 wherein deceleration signals exceeding the threshold value $L_3$ produce an output pulse of a given magnitude, as described above. This output pulse is supplied to gain 58 ($K_4$) and summer 54 also as described and also through a gain element 74 ($K_7$) to a summer 76. Also supplied to summer 76 through a gain $K_8$ (block 80) is a constant signal from circuit 78 when the wheel speed error is above a threshold $L_7$. This output from gain element 80 is used to keep the slip command signal $K_1$ from drifting too far from the normal range when the pilot is commanding insufficient brake pressure to reach the peak of the $\mu_o$–$\sigma$ curve. Keeping $K_1$ near normal value minimizes the number of cycles the system must make to locate the peak of the $\mu_o$–$\sigma$ curve when the pilot changes from a brake pressure command less than required for maximum braking to a command greater than required. Summer 76 also receives a fixed input signal $L_1$ as shown in FIG. 4. The output of summer 76 is supplied to an integrator 82 which responds to the fixed input signal $L_1$ by producing a gradually increasing value of $K_1$ or slip command, which value is subject to being reset to a lower value by the pulse outputs from pulse generator 56. A portion of the output of integrator 82 is fed back to summer 76 through a limit circuit 84 which operates to keep the slip command signal $K_1$ within certain desired minimum and maximum limits ($L_5$, $L_6$). Because of the polarities shown, the slip command signal is then reversed in phase in a summer 86 before being connected to the multiplier 44. As previously indicated, the skid control operates to control the brake pressure to values below that requested at the pilot's or operator's input to servovalve 68. When any one of the wheel speed sensors detects a slowing in rotation such that the deceleration detected in the corresponding differentiating circuit 24 exceeds the reference in threshold circuit 72, an output is produced from circuit 72 which produces an output pulse from the pulse generator 56. This pulse is supplied through gain element 58 to summer 54 to cause a short time release of brake pressure to permit the system to get a quicker start on removing the wheel deceleration. It is also supplied through gain element 74 to the summer 76 to be added to fixed input $L_1$ as a men of resetting the slip command signal $K_1$ to cause the percent slip to be reduced. After a reset pulse has been received from pulse generator 56, the integrator 82 responds to input $L_1$ to cause slip command signal $K_1$ to increase at an established rate so that a gradually increased slip will result. The input signals from limit circuits 78 and 84 serve to prevent the slip command signal $K_1$ from drifting too far from the normal range.

The slip command signal $k_1$ is then inverted in inverter 86 and is multiplied in multiplier 44 with the delayed wheel speed signal received from time constant circuit 42 to arrive at a wheel speed command signal which is, in turn, compared with the delayed wheel speed signal in summer 30 to produce a wheel speed error signal. This wheel speed error signal is then integrated in integrator 50 as described above and combined with the wheel speed error signal in summer 52.

The multiplier 60 combines with the speed error signal two terms combined in summer 48 which operate (1) to keep the wheel speed loop gain substantially constant despite varying wheel speed and (2) to vary the loop gain with changes in the required average brake pressure. This combined signal is then used to control the electrically driven servovalve 68 to control the brake pressure.

The output from gain $K_9$ is added to the input to integrator 50. This is done to quickly reset the integrator under large system transients caused by such factors as:
1. Sudden changes of the roadway such as from rough to icy or vice versa;
2. Sudden changes in the operator's brake pressure command to the servovalve 68; or
3. Where the vehicle bounces off the roadway surface.

It will be apparent to those skilled in the art that the system described herein may be implemented in a number of different forms. Operating brake pressures may typically be produced through either hydraulic or pneumatic systems. The several time-constant elements shown will vary in value depending upon the nature of the braked vehicle. Where the system is used for aircraft, means for responding to locked wheel and touchdown conditions will normally be included. While simple filtering means have often been adequate to deal with landing gear flexibility in the past, the present system has the capability for incorporating much more powerful dynamic damping means which are desirable for current applications, particularly in the aircraft field.

I claim:

1. A system for controlling skidding of a braked wheel comprising
    operator-operated means for producing a commanded brake pressure,
    means producing a first electrical signal varying with instantaneous angular velocity of said wheel,
    means converting said first signal to a second signal varying with rate of change of angular velocity of said wheel,
    a pulse generator responsive to values of said second signal above a threshold value to produce an output pulse,
    a constant voltage and summing means in which said output pulse is added to said constant voltage,
    means integrating the output signal from said summing means,
    means including a time constant circuit responsive to said first signal for producing a wheel speed reference signal,
    a multiplier multiplying said integrated output signal with said wheel speed reference signal to produce a wheel speed command signal,
    means comparing said wheel speed command signal with said first electrical signal to produce a wheel speed error signal,
    and control means responsive to said wheel speed error signal for modifying said operator-commanded brake pressure.

2. A control system for a braked wheel as set forth in claim 1 wherein a second integration means is provided, said wheel speed error signal is connected to said second integration means, and the resulting integrated signal is added to said wheel speed error signal.

3. A control system for a braked wheel as set forth in claim 1 including a summer, a reference voltage connected to said summer, means connecting said wheel speed reference signal to said summer, a second multiplier, and means connecting said wheel speed error signal and the output of said summer to said second multiplier.

4. A control system as set forth in claim 3 wherein a portion of the output of said second multiplier is fed back through time constant means to said summer.

5. A control system as set forth in claim 1 wherein the output pulse from said pulse generator is added to said wheel speed error signal.

6. A control system as set forth in claim 1 wherein limiting circuit means is provided and said wheel speed error signal is connected through said limiting circuit means to said summing means.

7. A control system as set forth in claim 6 wherein the output of said limited circuit means is connected through gain means to the input to said second integration means.

8. A control system as set forth in claim 1 wherein a portion of the output of said integrating means is fed back to said summing means.

9. A control system as set forth in claim 1 wherein said first electrical signal is connected through a time constant circuit before being connected to said wheel speed command signal to produce said wheel speed error signal.

10. A control system as set forth in claim 1 wherein means are provided producing electrical signals varying with instantaneous angular velocity of each of a plurality of wheels, each of said electrical signals is compared with the output of said time constant circuit, and summing means including unidirectional current conducting devices are provided at the input to said time constant circuit such that only the one of said electrical signals representative of the highest wheel angular velocity is supplied to said time constant circuit.

11. In a skid control system for a vehicle having at least one wheel equipped with a brake, servocontrol means responsive to an operator's command signal for actuating said brake, means for generating a first signal varying with angular velocity of said wheel, means responsive to said first signal for producing a second signal representative of rate of change of angular velocity of said wheel;
   computing means for modifying the output of said servocontrol means comprising
   time constant means connected to receive said first signal producing a reference signal,
   means producing a constant voltage, an integrator connected to receive said constant voltage to produce a gradually increasing output signal, multiplication means connected to receive said reference signal and means connecting said integrated signal to said multiplier to produce a wheel speed command signal;
   means responsive to said second signal for producing a single pulse output of substantially constant magnitude and duration each time said second signal exceeds a threshold value, and means adding said pulse output to said constant voltage;
   means comparing the output of said multiplier with said first signal to produce a wheel speed error signal;
   and means connecting said wheel speed error signal to said servocontrol means.

12. A skid control system as set forth in claim 11 including integration circuit means, a portion of said wheel speed error signal is integrated in said integration circuit means, and the output of said integration circuit means is added to said wheel speed error signal.

13. A skid control system as set forth in claim 11 wherein said pulse output is added to said wheel speed error signal.

14. A skid control system as set forth in claim 11 wherein a limit circuit is provided and a portion of said speed error signal is connected through said limit circuit and is added to said constant voltage.

15. A skid control system as set forth in clam 11 wherein a second multiplier is included, said wheel speed error signal is connected to said second multiplier, summing means is connected to said second multiplier and signals are connected to said summing means varying with changes in said reference signal and with the output of said second multiplier.

16. A skid control system as set forth in claim 11 including a second limit circuit and a portion of the output of said integrator is fed back through said limit circuit, the output of said limit circuit being added to said constant voltage.

17. A system for controlling skidding of a braked wheel comprising
   operator-operated means for producing a commanded brake pressure,
   generator means producing a signal varying with velocity of said wheel, said generator means receiving said signal and including time constant means whose output constitutes a reference signal,
   a multiplier connected to receive said reference signal,
   means responsive to said wheel velocity signal for producing a pulse signal in response to deceleration of said wheel exceeding a threshold value,
   summing means connected to receive said pulse signal and means producing a constant input signal also connected to said summing means,
   integration means connecting said summing means to said multiplier to produce a wheel speed command signal,
   a summer for adding said wheel velocity signal with said wheel speed command signal to produce a wheel speed error signal, and
   a second multiplier having its output connected to said operator-operated means and means for multiplying said wheel speed error signal in said multiplier with a signal varying with changes in said reference signal and with the output of said multiplier for modifying said commanded brake pressure.

18. A skid control system as set forth in claim 17 including integration circuit means, a portion of said wheel speed error signal is integrated in said integration circuit means, and the output of said integration circuit means is added to said wheel speed error signal.

19. A skid control system as set forth in claim 17 wherein said pulse signal is added to said wheel speed error signal.

20. A skid control system as set forth in claim 17 wherein a limit circuit is provided and a portion of said speed error signal is connected through said limit circuit and is added to said summing means, a gain circuit is provided, and the output of said limit circuit is also connected through said gain circuit to said integration circuit means.